United States Patent
Liu et al.

(10) Patent No.: US 10,212,675 B2
(45) Date of Patent: Feb. 19, 2019

(54) METHOD, TERMINAL DEVICE AND WIRELESS NETWORK NODE FOR MATCHING UPLINK COVERAGE AREA AND DOWNLINK COVERAGE AREA

(71) Applicant: Telefonaktiebolaget LM Ericsson (publ), Stockholm (SE)

(72) Inventors: Jinhua Liu, Beijing (CN); Gen Li, Beijing (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/541,061

(22) PCT Filed: Jan. 23, 2015

(86) PCT No.: PCT/CN2015/071385
§ 371 (c)(1),
(2) Date: Jun. 30, 2017

(87) PCT Pub. No.: WO2016/115717
PCT Pub. Date: Jul. 28, 2016

(65) Prior Publication Data
US 2018/0092052 A1   Mar. 29, 2018

(51) Int. Cl.
*H04W 52/36* (2009.01)
*H04W 24/02* (2009.01)
(Continued)

(52) U.S. Cl.
CPC ......... *H04W 52/367* (2013.01); *H04W 16/28* (2013.01); *H04W 24/02* (2013.01);
(Continued)

(58) Field of Classification Search
CPC ........... H04W 72/0406; H04W 72/042; H04W 52/283; H04W 52/143; H04W 48/12;
(Continued)

(56) References Cited

U.S. PATENT DOCUMENTS 5,287,544 A * 2/1994 Menich ............... H04W 72/082
455/450
6,456,652 B1   9/2002 Kim et al.
(Continued)

FOREIGN PATENT DOCUMENTS

| CN | 101959200 A | 1/2011 |
| CN | 103179652 A | 6/2013 |

(Continued)

OTHER PUBLICATIONS

PCT International Search Report for International application No. PCT/CN2015/071385—Oct. 28, 2015.
(Continued)

*Primary Examiner* — Shaima Q Aminzay
(74) *Attorney, Agent, or Firm* — Sage Patent Group

(57) ABSTRACT

Disclosed are methods, wireless network nodes and terminal devices for matching an uplink coverage area and a downlink coverage area. The method may include determine an uplink coverage margin and a downlink coverage margin, calculate an uplink-downlink coverage gap based on differences of the uplink coverage margins and the downlink coverage margins, determine whether the uplink coverage area and the downlink coverage area are matched with each other, and adjust at least one of the uplink coverage area and the downlink coverage area in response to a mismatch of the uplink coverage area and the downlink coverage area. With the proposed methods, wireless network nodes and terminal devices, the uplink and downlink coverage areas could be matched, thereby diminishing the communication overhead and decreasing the delay.

7 Claims, 6 Drawing Sheets

(51) Int. Cl.
*H04W 16/28* (2009.01)
*H04W 52/34* (2009.01)
*H04W 52/50* (2009.01)
*H04W 52/04* (2009.01)
*H04B 7/06* (2006.01)
*H04W 72/04* (2009.01)
*H04B 7/08* (2006.01)

(52) U.S. Cl.
CPC ......... *H04W 52/04* (2013.01); *H04W 52/343* (2013.01); *H04W 52/50* (2013.01); *H04B 7/0617* (2013.01); *H04B 7/086* (2013.01); *H04W 72/0473* (2013.01)

(58) Field of Classification Search
CPC ........... H04W 72/0473; H04W 72/085; H04W 24/02; H04W 16/28; H04W 72/0413
USPC ........................................................ 455/522
See application file for complete search history.

(56) References Cited

U.S. PATENT DOCUMENTS

| | | |
|---|---|---|
| 2004/0052230 A1 | 3/2004 | Soliman |
| 2011/0038308 A1 | 2/2011 | Song et al. |
| 2012/0115532 A1 | 5/2012 | He et al. |
| 2013/0203430 A1 | 8/2013 | Gan et al. |
| 2013/0217404 A1 | 8/2013 | Jung |
| 2013/0315083 A1 | 11/2013 | Jung |
| 2014/0016573 A1 | 1/2014 | Nuggehalli et al. |
| 2014/0146681 A1 | 5/2014 | Gusavec et al. |
| 2014/0185481 A1 | 7/2014 | Seol et al. |
| 2014/0335909 A1 | 11/2014 | Czerepinski |
| 2014/0348051 A1 | 11/2014 | Park et al. |
| 2015/0003278 A1 | 1/2015 | Yang et al. |

FOREIGN PATENT DOCUMENTS

| | | |
|---|---|---|
| CN | 104247525 A | 12/2014 |
| WO | 2004 028187 A1 | 4/2004 |
| WO | WO 2015 003365 A1 | 1/2015 |

OTHER PUBLICATIONS

PCT Written Opinion of the International Searching Authority for International application No. PCT/CN2015/071385—Oct. 28, 2015.
Partial Supplementary European Search Report for Application No./Patent No. 15878394.4-1854 / 3248406 PCT/CN2015071385—Jan. 5, 2018.
3GPP TSG-RAN2 Meeting #66; San Francisco, USA; Source: Motorola; Title: Measurements supporting minimisation of drive test use cases (Tdoc R2-093208)—May 4-8, 2009.
3GPP TSG RAN WG3 #68; Montreal, Canada; Source: ZTE; Title: Coverage and Capacity optimization (R3-101542)—May 10-14, 2010.
Extended European Search Report for Application No./Patent No. 15878394.4-1214 / 3248406 PCT/CN2015071385—Mar. 21, 2018.

* cited by examiner

METHOD, TERMINAL DEVICE AND WIRELESS NETWORK NODE FOR MATCHING UPLINK COVERAGE AREA AND DOWNLINK COVERAGE AREA

PRIORITY

This nonprovisional application is a U.S. National Stage Filing under 35 U.S.C. § 371 of International Patent Application Serial No. PCT/CN2015/071385 filed Jan. 23, 2015, and entitled "Method, Terminal Device and Wireless Network Node for Matching Uplink Coverage Area and Downlink Coverage Area."

TECHNICAL FIELD

The exemplary embodiments of the present disclosure relate generally to wireless communication field and, more specifically, relate to methods, terminal devices and wireless network nodes for matching an uplink coverage area and a downlink coverage area.

BACKGROUND

This section is intended to provide a background or context to the invention that is recited in the claims. The description herein may include concepts that could be pursued, but are not necessarily ones that have been previously conceived, implemented or described. Therefore, unless otherwise indicated herein, what is described in this section is not prior art to the description and claims in this application and is not admitted to be prior art by inclusion in this section.

Currently, mobile communication technologies are evolving to very high frequencies, larger carrier bandwidths, very high data rates and multiple heterogeneous layers. The future mobile networks are likely to be a combination of evolved 3G technologies, 4G technologies and emerging or substantially new components such as Ultra-Density Network ("UDN"), which is also referred to as mmW-radio access technology ("RAT"). Due to the increasing demand to enhance wireless capacity and the lack of availability of spectrum in the lower frequency range (e.g., 800 MHz~3 GHz), the use of frequencies in 10 GHz range is being investigated and higher frequency bands, for instance, in the range of 30 GHz, 60 GHz and 98 GHz for future mobile networks are also explored. At these high frequency bands, a very large bandwidth of spectrum could be obtained. This means that both operating frequency and bandwidth for the future mobile networks are expected to be much higher than those used in the legacy mobile networks. However, due to large signal attenuation with respect to path loss, the network operating over such high frequencies is supposed to cover small areas with densely deployed radio access nodes ("ANs") or access points ("APs"), such as base stations, thereby providing sufficient coverage for indoor/hot areas.

The mmW RAT as mentioned above is now being investigated to use a plenty of very high frequency bands. In order to conquer or compensate the large attenuation due to the utilization of the very high frequency bands, high gain beamforming is inevitable and may be mandatory. To this end, given relatively small wavelengths, more antenna elements with the same size may be integrated into an antenna panel, thereby making it possible to reach higher beamforming gains. However, when there are several tens or hundreds of antenna elements, it would engender unacceptable costs if one RF chain is arranged for each antenna element. In this case, multiple antenna elements sharing one RF chain and analog phase adjustment are applied for each antenna in order to adjust the beam direction and maximize the beamforming gains. With respect to the narrow transmitter ("TX") beams, the transmission of the downlink signals, for example, such as reference signals or beacon signals, should be carefully steered to enable AN discover area. In addition, the beamforming training should be carried out so as to maximize the beamforming gains during the service provision. The beamforming training herein may include both uplink and downlink beamforming training or both transmitter training and receiver training. The steered downlink transmission may increase the link gain while the beamforming training may maximize the beamforming gain of the service radio link.

For the downlink transmission detection, both the transmitter and receiver ("RX") beamforming gains may be expected. In particular, the transmitter beamforming is already enabled at the AN side and the terminal devices, such as the user equipments ("UEs") are able to blindly detect the downlink messages (e.g., beacon messages) using the receiver beamforming.

For the uplink control messages such as those transmitted on the physical random channel ("PRACH"), receiver beamforming gain may be expectable. However, the transmitter beamforming gain of the PRACH is hard to be fully achieved due to absence of beamforming training performed before PRACH transmission. In particular, the mobile terminals may only derive the uplink precoding matrix based on the angle of arrival (AoA) of the best beacon beam relying on the reciprocity. However, this is not so concrete since the downlink radio link and uplink radio link are served by different transmitter and receiver chains although they share the same air media. If a narrow receiver beam is used for PRACH reception and/or transmission, even relatively small direction deviation from the desired direction could clearly reduce the link gain of PRACH reception at the AN side. If signals on PRACH is transmitted with wide beams, the link gains for the PRACH transmission could be much smaller than the downlink beacon signal because the transmitter beamforming gain cannot be sufficiently achieved, which imposes a problem on the PRACH coverage. Moreover, in practice, a single AN network may be accessed by various terminal devices with different capabilities, for example, such as, different power classes, different numbers of antenna elements, different antenna manufacturing, different schemes to process beamforming, various mobility and interference situations, etc.

In view of the above, how to match the coverage of the downlink signal with that of the uplink signal so as to achieve better wireless transmission and reception should be taken into account, especially in the wireless communication of the high frequency bands.

SUMMARY

It is an object of the present disclosure to at least address the problems outlined above, and to provide methods, wireless network nodes and the terminal devices as follows.

According to an aspect of the present disclosure, there is provided a method implemented by a wireless network node for matching an uplink coverage area and a downlink coverage area. The method comprises determining, based on measurement reports from a plurality of terminal devices, an uplink coverage margin for detection of uplink transmission and a downlink coverage margin for reception of downlink transmission for each of the plurality of terminal devices.

The method also comprises calculating an uplink-downlink coverage gap based on differences of the uplink coverage margins and the downlink coverage margins with respect to the plurality of terminal devices. The method further comprises determining whether the uplink coverage area and the downlink coverage area are matched with each other based on the uplink-downlink coverage gap. The method additionally comprises adjusting at least one of the uplink coverage area and the downlink coverage area in response to determining that the uplink coverage area and the downlink coverage area are not matched with each other.

According to another aspect of the present disclosure, there is provided a method implemented by a terminal device for enabling a wireless network node to match an uplink coverage area and a downlink coverage area. The method comprises receiving a measurement instruction message from the wireless network node. The method also comprises measuring transmit power of uplink transmission and received power of downlink transmission based on the measurement instruction message. The method further comprises transmitting a measurement report regarding the transmit power and the received power to the wireless network node for matching the uplink coverage area and downlink coverage areas using the method as mentioned above and its various extensions as detailed later.

According to a further aspect of the present disclosure, there is provided a method implemented by a wireless network node for detecting uplink transmission. The method comprises determining one or more sweeping layers for detecting the uplink transmission. The method also comprises configuring, based on one or more traffic conditions within a coverage area of the wireless network node, the one or more sweeping layers for detecting the uplink transmission. In the method, the sweeping layer with a smaller coverage area has a wider receiver beam and smaller sweeping cycle than the one with a larger coverage area when more than one sweeping layer is determined.

According to an additional aspect of the present disclosure, there is provided a method implemented by a terminal device for performing uplink transmission. The method comprises receiving configuration message from a wireless network node, wherein the configuration message includes information regarding one or more sweeping layers within a coverage area of the wireless network node for detecting the uplink transmission, wherein each sweeping layer has a respective receiver beam width and a respective sweeping cycle and the sweeping layer with smaller coverage area has a wider receiver beam width and a smaller sweeping cycle than the one with larger coverage area. The method also comprises configuring one or more sweeping layers for the uplink transmission based on one or more reception conditions of downlink transmission from the wireless network node.

According to one aspect of the present disclosure, there is provided a wireless network node for matching an uplink coverage area and a downlink coverage area. The wireless network node comprises a processor and a memory, the memory containing instructions executable by the processor, whereby the wireless network node is operative to determine, based on measurement reports from a plurality of terminal devices, an uplink coverage margin for detection of uplink transmission and a downlink coverage margin for reception of downlink transmission for each of the plurality of terminal devices. The wireless network node is also operative to calculate an uplink-downlink coverage gap based on differences of the uplink coverage margins and the downlink coverage margins with respect to the plurality of terminal devices. The wireless network node is further operative to determine whether the uplink coverage area and the downlink coverage area are matched with each other based on the uplink-downlink coverage gap. The wireless network node is additionally operative to adjust at least one of the uplink coverage area and the downlink coverage area in response to determining that the uplink coverage area and the downlink coverage area are not matched with each other.

According to another aspect of the present disclosure, there is provided a wireless network node for matching an uplink coverage area and a downlink coverage area. The wireless network node comprises processing means. The processing means is operative to determine, based on measurement reports from a plurality of terminal devices, an uplink coverage margin for detection of uplink transmission and a downlink coverage margin for reception of downlink transmission for each of the plurality of terminal devices. The wireless network node also comprises calculate an uplink-downlink coverage gap based on differences of the uplink coverage margins and the downlink coverage margins with respect to the plurality of terminal devices. The processing means is further operative to determine whether the uplink coverage area and the downlink coverage area are matched with each other based on the uplink-downlink coverage gap. The processing means is additionally operative to adjust at least one of the uplink coverage area and the downlink coverage area in response to determining that the uplink coverage area and the downlink coverage area are not matched with each other.

According to a further aspect of the present disclosure, there is provided a wireless network node for matching an uplink coverage area and a downlink coverage area. The wireless network node comprises a first determining module for determining, based on measurement reports from a plurality of terminal devices, an uplink coverage margin for detection of uplink transmission and a downlink coverage margin for reception of downlink transmission for each of the plurality of terminal devices. The wireless network node also comprises a calculating module for calculating an uplink-downlink coverage gap based on differences of the uplink coverage margins and the downlink coverage margins with respect to the plurality of terminal devices. The wireless network node further comprises a second determining module for determining whether the uplink coverage area and the downlink coverage area are matched with each other based on the uplink-downlink coverage gap. The wireless network node additionally comprises an adjusting module for adjusting at least one of the uplink coverage area and the downlink coverage area in response to determining that the uplink coverage area and the downlink coverage area are not matched with each other.

According to one aspect of the present disclosure, there is provided a terminal device for enabling a wireless network node to match an uplink coverage area and a downlink coverage area. The terminal device comprises a processor and a memory, the memory containing instructions executable by the processor, whereby the terminal device is operative to receive a measurement instruction message from the wireless network node. The terminal device is also operative to measure transmit power of uplink transmission and received power of downlink transmission based on the measurement instruction message. The terminal device is further operative to transmit a measurement report regarding the transmit power and the received power to the wireless network node for matching the uplink coverage area and downlink coverage areas using the method as discussed before.

According to another aspect of the present disclosure, there is provided a terminal device for enabling a wireless network node to match an uplink coverage area and a downlink coverage area. The terminal device comprises processing means operative to receive a measurement instruction message from the wireless network node. The processing means is also operative to measure transmit power of uplink transmission and received power of downlink transmission based on the measurement instruction message. The processing means is additionally operative to transmit a measurement report regarding the transmit power and the received power to the wireless network node for matching the uplink coverage area and downlink coverage areas using the method as discussed before.

According to a further aspect of the present disclosure, there is provided a terminal device for enabling a wireless network node to match an uplink coverage area and a downlink coverage area. The terminal device comprises a receiving module for receiving a measurement instruction message from the wireless network node. The terminal device also comprises a measuring module for measuring transmit power of uplink transmission and received power of downlink transmission based on the measurement instruction message. The terminal device further comprises a transmitting module for transmitting a measurement report regarding the transmit power and the received power to the wireless network node for matching the uplink coverage area and downlink coverage areas using the method as discussed before.

According to one aspect of the present disclosure, there is provided a wireless network node for detecting uplink transmission. The wireless network node comprises a processor and a memory, the memory containing instructions executable by the processor, whereby the wireless network node is operative to determine one or more sweeping layers for detecting the uplink transmission. The wireless network node is also operative to configure, based on one or more traffic conditions within a coverage area of the wireless network node, the one or more sweeping layers for detecting the uplink transmission, wherein the sweeping layer with a smaller coverage area has a wider receiver beam and smaller sweeping cycle than the one with a larger coverage area when more than one sweeping layer is determined.

According to another aspect of the present disclosure, there is provided a wireless network node for detecting uplink transmission. The wireless network node comprises processing means operative to determine one or more sweeping layers for detecting the uplink transmission. The processing means is also operative to configure, based on one or more traffic conditions within a coverage area of the wireless network node, the one or more sweeping layers for detecting the uplink transmission, wherein the sweeping layer with a smaller coverage area has a wider receiver beam and smaller sweeping cycle than the one with a larger coverage area when more than one sweeping layer is determined.

According to a further aspect of the present disclosure, there is provided a wireless network node for detecting uplink transmission. The wireless network node comprises a determining module for determining one or more sweeping layers for detecting the uplink transmission. The wireless network node also comprises a configuring module for configuring, based on one or more traffic conditions within a coverage area of the wireless network node, the one or more sweeping layers for detecting the uplink transmission, wherein the sweeping layer with a smaller coverage area has a wider receiver beam and smaller sweeping cycle than the one with a larger coverage area when more than one sweeping layer is determined.

According to one aspect of the present disclosure, there is provided a terminal device for performing uplink transmission. The terminal device comprises a processor and a memory, the memory containing instructions executable by the processor, whereby the terminal device is operative to receive a configuration message from a wireless network node, wherein the configuration message includes information regarding one or more sweeping layers within a coverage area of the wireless network node for detecting the uplink transmission, wherein each sweeping layer has a respective receiver beam width and a respective sweeping cycle and the sweeping layer with smaller coverage area has a wider receiver beam width and a smaller sweeping cycle than the one with larger coverage area. The terminal device is also operative to configure one or more sweeping layers for the uplink transmission based on one or more reception conditions of downlink transmission from the wireless network node.

According to another aspect of the present disclosure, there is provided a terminal device for performing uplink transmission. The terminal device comprises processing means operative to receive a configuration message from a wireless network node, wherein the configuration message includes information regarding one or more sweeping layers within a coverage area of the wireless network node for detecting the uplink transmission, wherein each sweeping layer has a respective receiver beam width and a respective sweeping cycle and the sweeping layer with smaller coverage area has a wider receiver beam width and a smaller sweeping cycle than the one with larger coverage area. The processing means is also operative to configure one or more sweeping layers for the uplink transmission based on one or more reception conditions of downlink transmission from the wireless network node.

According to a further aspect of the present disclosure, there is provided a terminal device for performing uplink transmission. The terminal device comprises a receiving module for receiving a configuration message from a wireless network node, wherein the configuration message includes information regarding one or more sweeping layers within a coverage area of the wireless network node for detecting the uplink transmission, wherein each sweeping layer has a respective receiver beam width and a respective sweeping cycle and the sweeping layer with smaller coverage area has a wider receiver beam width and a smaller sweeping cycle than the one with larger coverage area. The terminal device also comprises a configuring module for configuring one or more sweeping layers for the uplink transmission based on one or more reception conditions of downlink transmission from the wireless network node.

By means of the solutions set forth in the above aspects of the present disclosure and those as discussed hereinafter, the detection coverage area of the uplink transmission, for example, the physical random access channel transmission or scheduling request transmission, could be adjusted to match the coverage area of the downlink transmission, for example, the beacon signal transmission or uplink scheduling grant transmission. Therefore, the beam sweeping could be optimized at the terminal device side, at the wireless network node, or at both. Further, due to the respective coverage areas are matched with regards to the uplink transmission and downlink transmission, it is easier and more likely for the terminal devices to successfully access to the AN without any extra delay, i.e., improving the success rate of the uplink and downlink transmission. Additionally, since multiple sweeping layers are proposed and may be dynamically configured for the downlink and uplink transmission at least according to current communication traffic conditions, the sweeping efficiency could be enhanced and processing overhead could be saved.

BRIEF DESCRIPTION OF THE DRAWINGS

In the following, the disclosure will be discussed in greater detail by means of exemplary embodiments with reference to the accompanying drawings, in which.

DETAILED DESCRIPTION

The present disclosure will now be described more fully hereinafter with reference to the accompanying drawings, in which certain embodiments of the present disclosure are shown. This disclosure may, however, be embodied in many different forms and should not be construed as limited to the embodiments set forth herein; rather, these embodiments are provided by way of example so that this disclosure will be thorough and complete, and will fully convey the scope of the present disclosure to those skilled in the art. Like numbers refer to like elements throughout the specification.

Generally, all terms used in the claims are to be interpreted according to their ordinary meaning in the technical field, unless explicitly defined otherwise herein. For example, the terminal device in the present disclosure may be any terminal capable of receiving information from and/or transmitting information to the network, connectable to the network wirelessly or via a fixed connection. Examples of a wireless network node may refer to any suitable radio access point or access node, for example a radio base station ("BS") according to any suitable communication standard, such as a Node B ("NB") or an evolved NB ("eNB"), for carrying out the solutions as discussed in detail later with reference to the accompanying drawings.

All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated. The discussion above and below in respect of any of the aspects of the present disclosure is also in applicable parts relevant to any other aspect of the present disclosure.

Figure 1:
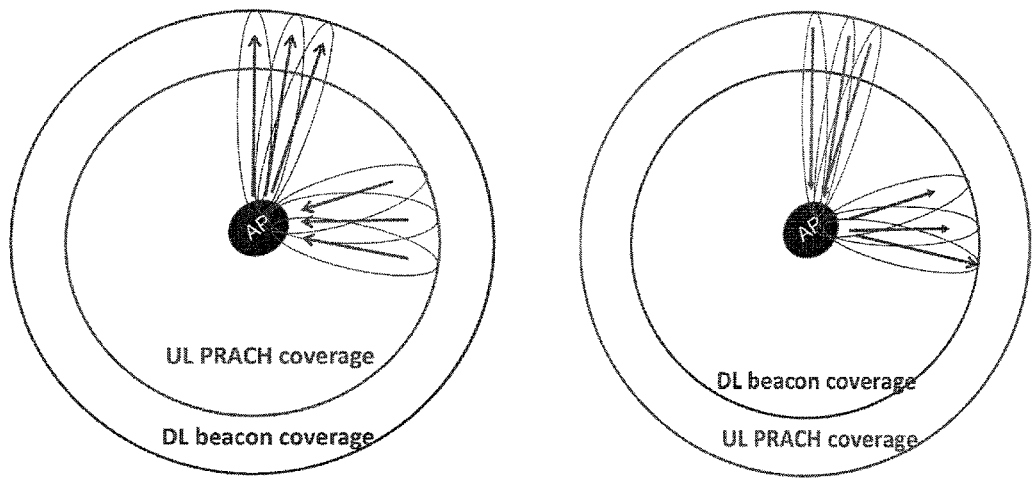
FIG. 1 schematically illustrates two scenarios in which the respective coverage areas of the PRACH and the DL beacon transmission are mismatched.

FIG. 1 schematically illustrates two scenarios in which the respective coverage areas of the PRACH in the uplink direction and the downlink beacon transmission are mismatched. It should be understood that different coverage areas provided by an AP for different transmission or reception purposes are represented by circles with different sizes. As illustrated in the left part of FIG. 1, the AP is located at the center of two concentric circles, of which, the bigger one indicates the DL beacon coverage area and the smaller one indicates the PRACH coverage area, meaning that the AP provides two different coverage areas under different conditions. As shown, the AP applies beams with wider beam widths to provide the smaller PRACH coverage area and applies beams with narrower beam widths to provide the greater DL beacon coverage area. In contrast, as illustrated in the right part of FIG. 1, the AP also provides different coverage areas, wherein the DL beacon coverage area is less than the PRACH coverage area due to the wider beam widths for the DL beacon coverage area and the narrower beam widths for the PRACH coverage area.

It should be noted that the above examples illustrate different coverage areas by means of the different widths of the beams. However, there may be other factors that could impact the coverage area of the AP, which may include but are not limited to different transmit power, different levels of beamforming training, etc. For example, low transmit power implies a smaller coverage area as compared to the high transmit power.

Neither of the above illustrated scenarios is desirable for AP's uplink reception and the DL transmission since the DL and UL coverage area mismatch may increase the communication failure rate and elongate the delay, thereby diminishing the wireless communication efficiency and increasing the communication overhead.

To this end, the present disclosure proposes a number of efficient methods and corresponding apparatuses, such as the wireless network node and the terminal device to enable UL-DL coverage area matching and dynamic changes of the sweeping layers.

Figure 2:
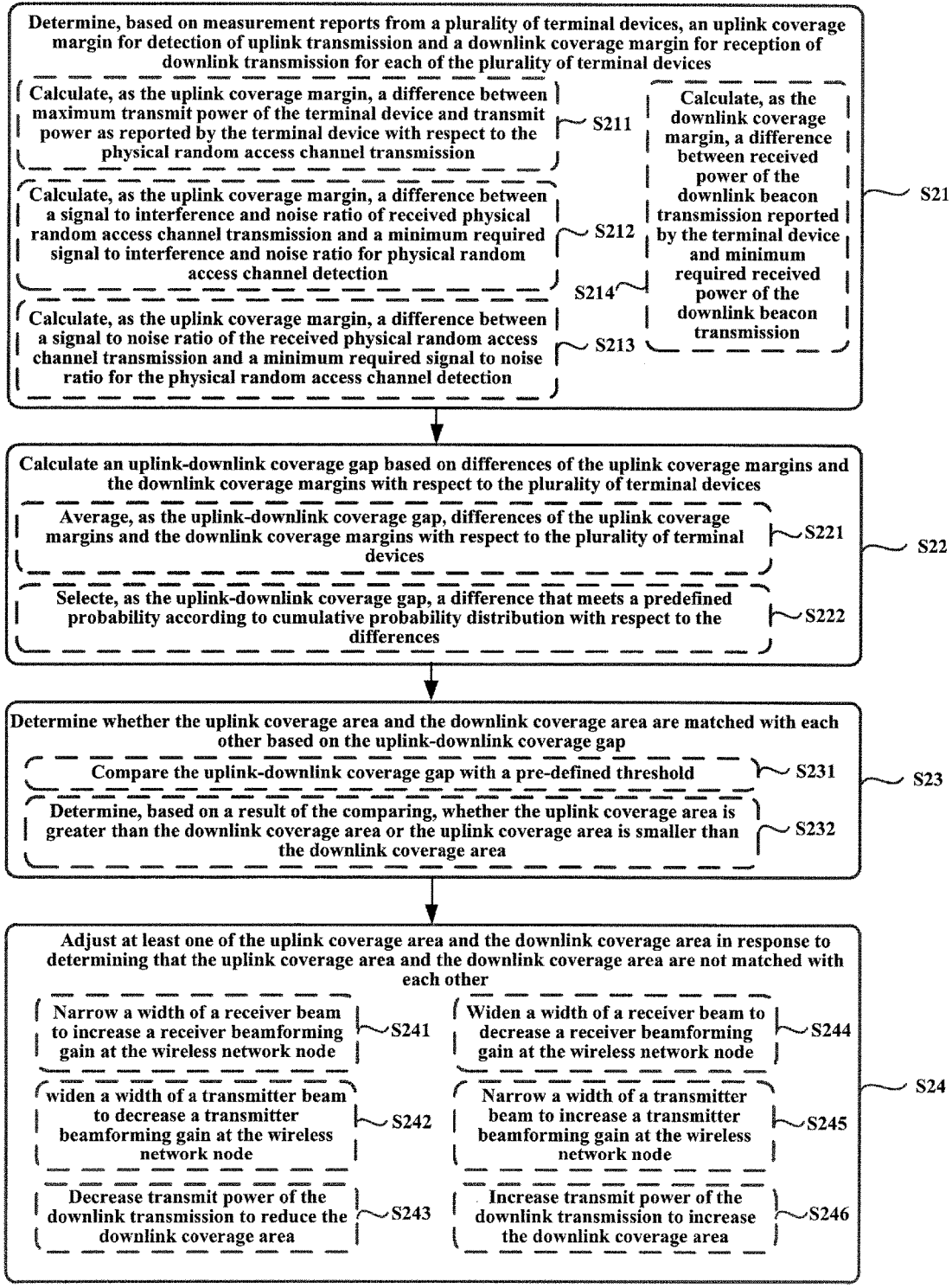
FIG. 2 is a logic flow diagram exemplarily illustrating a method for matching an uplink coverage area and a downlink coverage area according to one or more embodiments of the present disclosure.

FIG. 2 is a logic flow diagram exemplarily illustrating a method 20 for matching an uplink coverage area and a downlink coverage area according to one or more embodiments of the present disclosure. It is to be understood that the method 20 may be implemented by a wireless network node, such as the AP as shown in FIG. 1, the BS, or the eNB, which is capable of providing radio access to a number of the terminal devices within its service area.

As illustrated in FIG. 2, at block S21, the method 20 determines, based on measurement reports from a plurality of terminal devices, an uplink coverage margin for detection of uplink transmission and a downlink coverage margin for reception of downlink transmission for each of the plurality of terminal devices.

In one or more embodiments, the uplink transmission is one of physical random access transmission and scheduling request transmission, and the downlink transmission is one of beacon signal transmission and measurement feedback transmission.

In one or more embodiments, the wireless network node may configure a plurality of terminal devices to measure the PRACH transmission power and the received beacon power and report back for each radio link setup. The terminal devices may report these measurements upon completion of the radio link setup.

Upon receipt of the measurement reports from the terminal devices, the wireless network node may estimate the PRACH coverage margin and DL beacon coverage margin in an exemplary manner as follows:

First, the wireless network node may calculate a UL coverage margin according to the transmit power margin of the terminal device or the reception quality of the PRACH transmission dependent on the PRACH transmission methods.

Example 1: Transmitter Power Based Approach

In case that power ramping is used in the PRACH transmission at the terminal device side and the PRACH transmit power may reach a required level such that the RACH signal could be detected by the wireless network node, the UL coverage margin may be evaluated or calculated as a different between the maximum transmit power and the PRACH transmit power when the PRACH is detected by the wireless network node:

$$\text{Margin}_{UL\ coverage} = P_{transmitter,MAX,TD} - P_{PRACH,report}\ (dB), \quad (1)$$

where $P_{PRACH,report}$ denotes the transmit power of the terminal device when the PRACH signal is detected, $P_{transmitter,MAX,TD}$ denotes the maximum allowed transmission power for PRACH transmission by the terminal device, and $\text{Margin}_{UL\ coverage}$ denotes the UL coverage margin relative to the terminal device's geographical location.

Therefore, based on the above example 1, the method 20 may, at block S211, calculate, as the uplink coverage margin, a difference between maximum transmit power of the terminal device and transmit power as reported by the terminal device with respect to the physical random access channel transmission.

Example 2: PRACH Reception Quality Based Approach

In case that the terminal device transmits the PRACH signal at the fixed power, for example, the maximum terminal device transmit power, then the uplink coverage margin may be calculated according to a signal to interference and noise ratio ("SINR") estimated at the AN side:

$$\text{Margin}_{UL\ coverage} = SINR_{PRACH,received} - SINR_{PRACH,min}\ (dB), \quad (2)$$

where $SINR_{PRACH,received}$ denotes the SINR of the PRACH signal when the PRACH is detected at the wireless network node and $SINR_{PRACH,min}$ denotes a minimum required SINR for the PRACH detection in order to guarantee an expected detection ratio of the PRACH signal.

Therefore, based on the above example 2, the method 20 may, at block S212, calculate, as the uplink coverage margin, a difference between a signal to interference and noise ratio of received PRACH transmission and a minimum required signal to interference and noise ratio for PRACH detection. Alternatively, the method 20 may, at block S213, calculate, as the uplink coverage margin, a difference between a signal to noise ratio ("SNR") of the received PRACH transmission and a minimum required signal to noise ratio for the PRACH detection.

Second, the wireless network node may calculate the downlink coverage margin relative to the terminal devices' geographical locations as follows using the beacon signals as exemplary downlink signals:

$$\text{Margin}_{DL\ coverage} = P_{received,beacon,TD} - P_{received,beacon,min}\ (dB), \quad (3)$$

where $P_{received,beacon,TD}$ denotes the received power of the beacon signal at the terminal device, $P_{received,beacon,min}$ denotes an acceptable minimum received beacon power at the cell edge, which could be an empirical value and determined or preset in advance, $\text{Margin}_{DLcoverage}$ denotes the downlink coverage margin relative to the terminal devices' geographical locations.

Therefore, based on the above example, the method 20 may, at block S214, calculate, as the downlink coverage margin, a difference between received power of the downlink beacon transmission reported by the terminal device and minimum required received power of the downlink beacon transmission.

It is to be understood by those skilled in the art that there is no particular sequence regarding calculating a DL coverage margin and calculating a UL coverage margin. As illustrated in FIG. 2, block S214 could be carried out before or after any of the alternative blocks S211, S212 and S213, or could be conducted concurrently or in parallel with these alternative blocks.

Upon determination of the uplink coverage margin and the downlink coverage margin, the method 20 advances to block S22, at which an uplink-downlink coverage gap is calculated based on differences of the uplink coverage margins and the downlink coverage margins with respect to the plurality of terminal devices. The exemplary determinations of the uplink-downlink coverage gap could be as follows:

Example 1: an uplink-downlink coverage gap could be obtained using the following equation:

$$Gap_{final-1} = \frac{1}{N}\sum_{i=1}^{N}(Margin_{DLcoverage,i} - Margin_{ULcoverage,i}), \quad (4)$$

where i denotes an index of the reports of the terminal devices, $\text{Margin}_{DLcoverage,i}$ denotes a downlink coverage margin according to the $i^{th}$ report, $\text{Margin}_{ULcoverage,i}$ denotes a uplink coverage margin according to the $i^{th}$ report, and $Gap_{final-1}$ denotes an average UL to DL coverage gap, i.e., the uplink-downlink coverage gap as mentioned above, which may be statistically obtained based on the above calculations directed to a plurality of terminal devices that may be randomly or regularly selected.

Therefore, based on this example, the method 20 may, at block S221, average, as the uplink-downlink coverage gap, differences of the uplink coverage margins and the downlink coverage margins with respect to the plurality of terminal devices.

Example 2: an uplink-downlink coverage gap could be a gap corresponding to a certain percentage ratio of all the calculated gaps gradually obtained according to each report, for example, the item "$\text{Margin}_{DLcoverage,i} - \text{Margin}_{ULcoverage,i}$" in the above equation. For instance, in one or more embodiments, the uplink-downlink coverage gap could be derived or selected based on a cumulative distribution function ("CDF") curve of all the calculated gaps according to each report. Therefore, based on this example, the method 20 may, at block S222, select, as the uplink-downlink coverage gap, a difference that meets a predefined probability according to cumulative probability distribution with respect to the differences, for example, a number of the differences $Margin_{DLcoverage,i} - Margin_{ULcoverage,i}$.

Upon obtaining the uplink-downlink coverage gap, the method 20 proceeds to block S23, at which, the method 20 determines whether the uplink coverage area and the downlink coverage area are matched with each other based on the uplink-downlink coverage gap.

In one or more embodiments, the method 20 may, at block S231, compare the uplink-downlink coverage gap with a pre-defined threshold and then at block S232, the method 20 may determine, based on a result of the comparing, whether the uplink coverage area is greater than the downlink coverage area or the uplink coverage area is smaller than the downlink coverage area.

For example, there may be two predefined thresholds, e.g., $Threshold_A$ and $Threshold_B$ and correspondingly, the mismatch between the uplink coverage area and the downlink coverage area could be determined through the following in equation:

$$Gap_{final-1} \geq Threshold_A \quad (5)$$

If the above in equation is satisfied, it can be determined that the uplink coverage area is smaller than the downlink coverage areas, such as the situation as shown in the left part of FIG. 1.

In one or more embodiments, the equation (4) may be varied to the following equation:

$$Gap_{final-2} = \frac{1}{N}\sum_{i=1}^{N}(Margin_{ULcoverage,i} - Margin_{DLcoverage,i}), \quad (6)$$

Consequently, the mismatch between the uplink coverage area and the downlink coverage area could be determined through the following in equation:

$$Gap_{final-2} \geq Threshold_B \quad (7)$$

If the above in equation is satisfied, it can be determined that the uplink coverage area is greater than the downlink coverage areas, such as the situation as shown in the right part of FIG. 1, which is totally different and opposite situation as shown in the left part.

In case that neither of the in equations (5) and (7) is satisfied, it may be determined that there is a match between the uplink coverage area and the downlink coverage area, for example, the PRACH and DL beacon coverage areas.

The arrangements of the thresholds herein are only for an illustrative purpose and a person skilled in the art, based on the teaching of the present disclosure, may select or set more or less thresholds for a relatively rough or finer determination of the mismatch according to the statistics. For example, in one embodiment, one threshold which is set as a positive number could be used instead of the two thresholds as exampled above, that is, only the equation (4) and the in equation (5) with their variants are applied. In this case, if the resulting $Gap_{final-1}$ is a positive number and greater than the threshold, then it can be determined that the downlink coverage area is greater than the uplink coverage area. Similarly, if the resulting $Gap_{final-1}$ is a positive number and less than the threshold, then it can be determined that the downlink coverage area is smaller than the uplink coverage area. In contrast, if the resulting $Gap_{final-1}$ is a negative number and its absolute value is greater than the threshold, then it can be determined that the uplink coverage area is greater than the downlink coverage area. Similarly, if the resulting $Gap_{final-1}$ is a negative number and its absolute value is smaller than the threshold, then it can be determined that the uplink coverage area is smaller than the downlink coverage area.

In response to determining that the uplink coverage area and the downlink coverage area are not matched with each other, the method 20 adjusts at least one of the uplink coverage area and the downlink coverage area at block S24.

In one or more embodiments, in response to the uplink coverage area being smaller than the downlink coverage area, the method 20 may adjust the at least one of the uplink coverage area and the downlink coverage area by at least one of the following:

narrowing, at block S241, a width of a receiver beam to increase a receiver beamforming gain at the wireless network node;

widening, at block S242, a width of a transmitter beam to decrease a transmitter beamforming gain at the wireless network node; and decreasing, at block S243, transmit power of the downlink transmission to reduce the downlink coverage area.

In one or more embodiments, in response to the uplink coverage area being greater than the downlink coverage area, the method 20 may adjust the at least one of the uplink coverage area and the downlink coverage area by at least one of the following:

widening, at block S244, a width of a receiver beam to decrease a receiver beamforming gain at the wireless network node;

narrowing, at block S245, a width of a transmitter beam to increase a transmitter beamforming gain at the wireless network node; and increasing, at block S246, transmit power of the downlink transmission to increase the downlink coverage area.

According to one or more embodiments, in case of a smaller uplink coverage area, it is desired that the receiver beamforming gain increases since the receiver beam width decrease may compensate the coverage area mismatch. However, if the receiver beamforming gain already reaches the maximum (i.e., a narrowest receiver beam has already been used) and the uplink coverage area is still smaller than the downlink coverage area, there will be no further transmitter beam width adjustment. In this case, it would be useful to increase the downlink beam width to reduce the downlink overhead and pollution (e.g., beacon pollution) since the too large downlink coverage area may be detrimental to the whole system performance.

According to one or more embodiments, in case of a greater uplink coverage area, in order to decrease the uplink detection coverage area, the receiver beam is widened to decrease the receiver beamforming gain for the uplink detection, e.g., a PRACH detection. Further, the number of the receiver beams in one receiver beam sweeping cycle may be decreased proportionally, thereby decreasing the receiver beam sweeping overhead. In case that the DL coverage area may be enlarged by increasing the transmit power of the downlink signal or by using a narrower transmitter beam width, it may be helpful to enlarge the downlink coverage area to match the uplink coverage so that the effective coverage of the wireless network node may be increased, rather than reducing the coverage of the uplink coverage area, e.g., the PRACH coverage area.

According to the above descriptions made with reference to FIGS. 1 and 2, it is to be understood that the mismatch between the uplink coverage area and the downlink coverage area could be diminished or even eliminated based on the solutions as discussed above from a perspective of the wireless network node. Thereby, the efficient coverage areas with respect to the uplink and downlink could be obtained and communication delays and costs could be further decreased.

Figure 3:
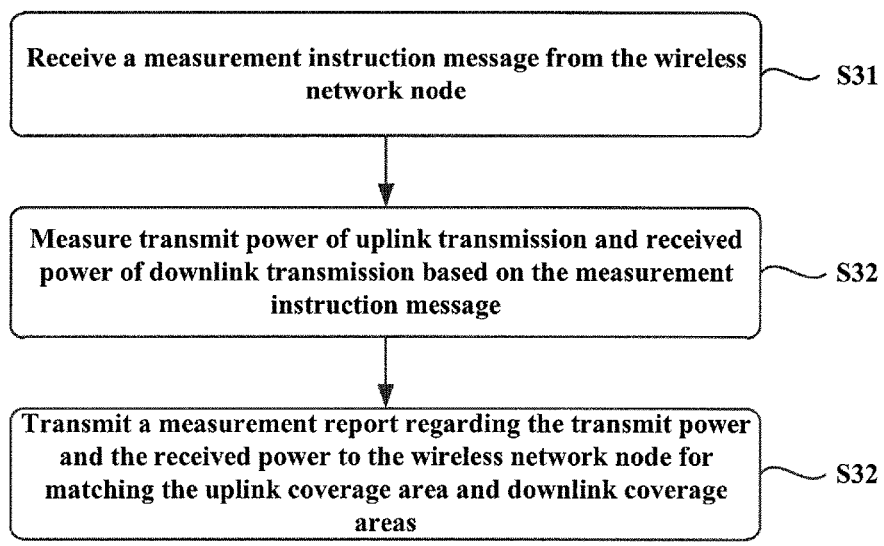
FIG. 3 is a logic flow diagram exemplarily illustrating a method for enabling a wireless network node to match an uplink coverage area and a downlink coverage area according to one or more embodiments.

FIG. 3 is a logic flow diagram exemplarily illustrating a method 30 for enabling a wireless network node to match an uplink coverage area and a downlink coverage area according to one or more embodiments. It is to be understood that the method 30 could be implemented by a terminal device, for example, the user equipment.

As illustrated in FIG. 3, the method 30 begins at block S31, at which the method 30 receives a measurement instruction message from the wireless network node, which could be the one as discussed about with reference to FIGS. 1 and 2. This measurement instruction message may be transmitted to the terminal device from the wireless network node via a radio resource control ("RRC") message or a system information block ("SIB") and include a number of measurement configurations with respect to uplink and downlink transmission.

Then, at block S32, the method 30 measures transmit power of uplink transmission and received power of downlink transmission based on the measurement instruction message. In one or more embodiments, the transmit power herein may be PRACH transmit power and the received power may be related to the downlink reference signal, such as the beacon, as discussed previously.

After completion of the measurements with respect to the uplink and downlink transmission, the method 30, at block S32, transmits a measurement report regarding the transmit power and the received power to the wireless network node for matching the uplink coverage area and the downlink coverage areas. The matching as performed at the wireless network node may be based on the one or more embodiments as detailed above with reference to FIGS. 1 and 2.

As mentioned before, the receiver beamforming gain for uplink detection, e.g., PRACH detection, may be achieved by receiver beam sweeping at the wireless network node side. However, the transmitter beamforming for the uplink transmission at the terminal device side cannot be determined due to inconsistently-reliable channel reciprocity. In contrast, the transmitter beamforming gains and receiver beaming gains for the DL transmission, for example, the beacon transmission, may both be achieved. Although the uplink coverage area and the downlink coverage area may be simply matched with one another by adjusting the receiver beam width in the receiver beam sweeping, the receiver beam width may be very small and therefore the number of receiver beams in one receiver sweeping cycle may be too many. This could result in unduly high overhead for uplink detection, for example, the PRACH detection. To this end, the present disclosure proposes adaptive multiple-layer based solutions, as will be discussed in the following with reference to FIGS. 4-6.

Figure 4:
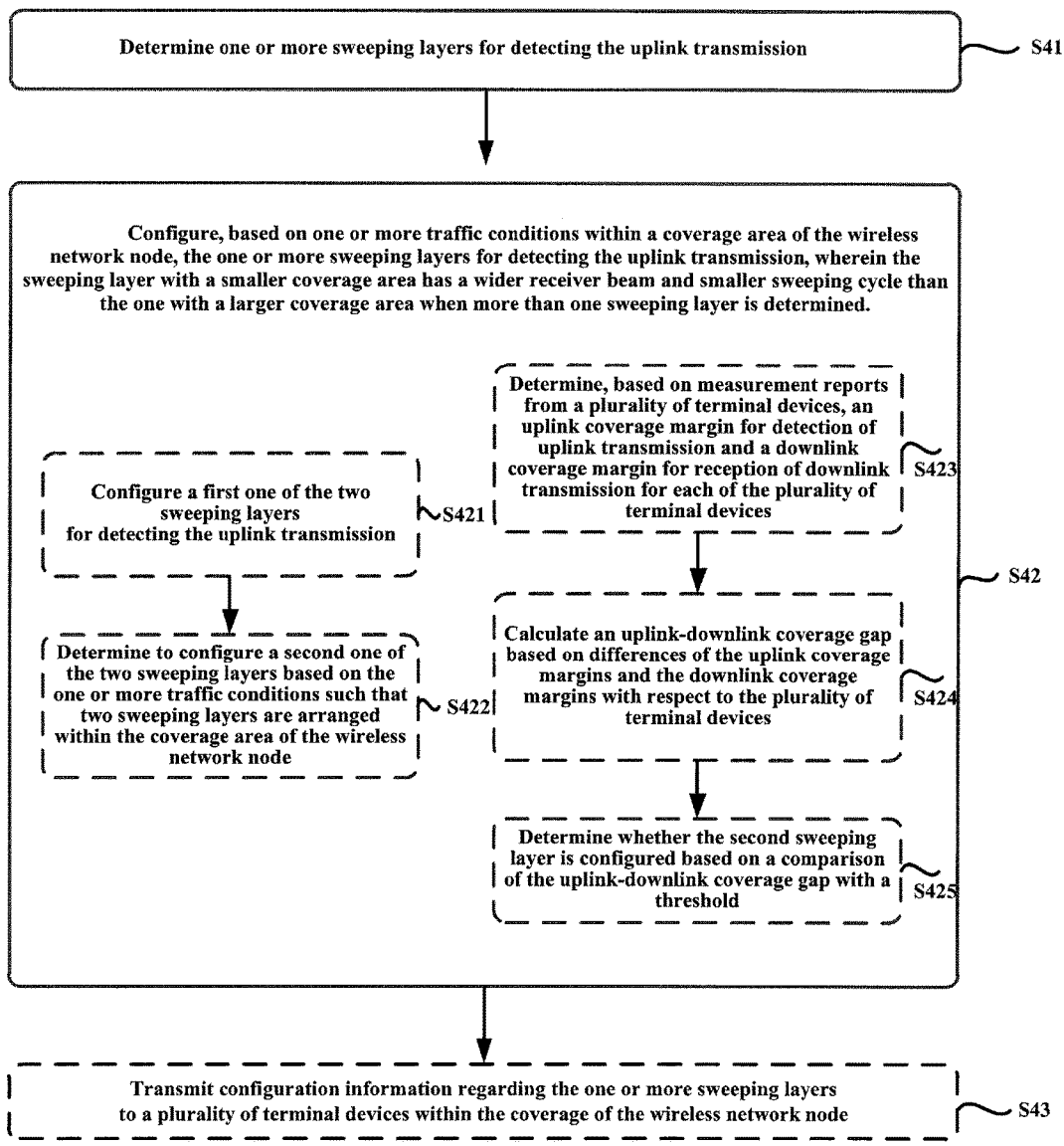
FIG. 4 is a logic flow diagram exemplarily illustrating a method for detecting uplink transmission according to one or more embodiments.

FIG. 4 is a logic flow diagram exemplarily illustrating a method 40 for detecting uplink transmission according to one or more embodiments. It is to be understood the method 40 could be implemented by a wireless network node.

As illustrated in FIG. 4, the method 40 determines, at block S41, one or more sweeping layers for detecting the uplink transmission. The determination herein may be made based on a number of factors according to various embodiments. For example, in an embodiment, the determination may be made by statistical analysis and the number of the sweeping layers may be set according to empirical values. In another embodiment, the wireless service operators may be able to determine the number of the sweeping layers and make specific configurations for the wireless network node based on the statistical data, such as data traffic, data throughput, and registered users, collected in a relatively long period of time. It is to be understood that the embodiments herein are merely for an illustrative purpose and a person skilled in the art is able to devise other possible determining manners based on the teaching herein, which are still within the scope of the present disclosure.

In one or more embodiments, the sweeping layer with a smaller coverage area has a wider receiver beam and smaller sweeping cycle than the one with a larger coverage area when more than one sweeping layer is determined. For a better understanding of the multiple layer arrangements, reference should be made to FIG. 6, which shows two sweeping layers, i.e., the sweeping layer 1 and the sweeping layer 2, wherein the sweeping layer 1 has a wider coverage area with a narrower receiver beam and the sweeping layer 2 has a smaller coverage area with a wider receiver beam.

After the determination of the one or more sweeping layers, the method 40 proceeds to block S42, at which the method 40 configures, based on one or more traffic conditions within a coverage area of the wireless network node, the one or more sweeping layers for detecting the uplink transmission.

In one or more embodiments, the method 40 transmits, at block S43, configuration information regarding the one or more sweeping layers to a plurality of terminal devices within the coverage of the wireless network node. In this manner, the terminal device may adaptively select one or more sweeping layers for uplink transmission.

In one or more embodiments, the method 40 may determine two sweeping layers and configure, at block S421, a first one of the two sweeping layers for detecting the uplink transmission. Then, at block S422, to configure a second one of the two sweeping layers based on the one or more traffic conditions such that two sweeping layers are arranged within the coverage area of the wireless network node.

The one or more traffic conditions herein may be one or more of the number of served radio connections, the number of terminal devices camped in the network, the data rates within an access node or access node cluster, etc. Thereby, the occurrence of the configuration could be based on whether the traffic condition exceeds a preset threshold. For example, if the number of the served radio connections is greater than the preset threshold, then more than one sweeping layers could be used. By contrast, if the number of the served connections is less than the preset threshold, then the number of used sweeping layers could be decreased. It is apparent to those skilled in the art that more thresholds could be predetermined and set for different situations. Practically, the determination as to the number of sweeping layers would also possibly be restricted to operating policy of the operator.

Figure 6:
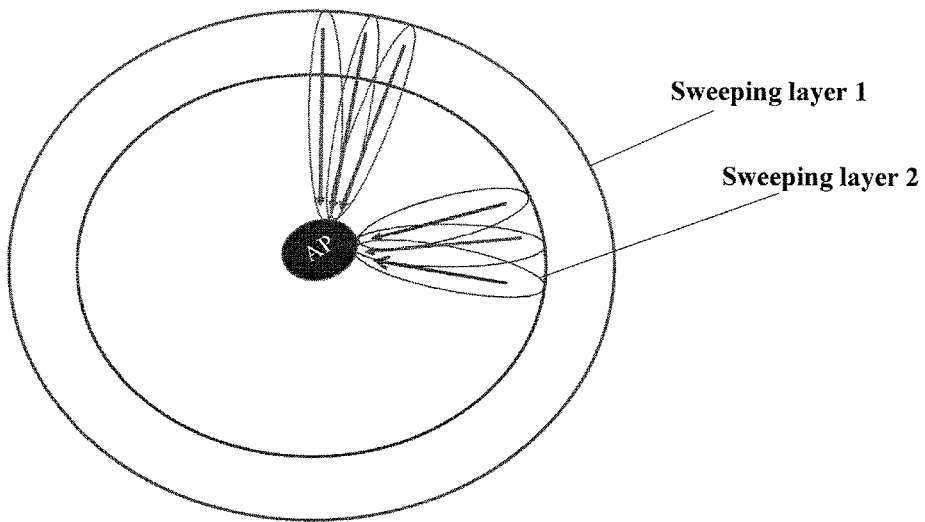
FIG. 6 is a schematic diagram illustrating a dual sweeping layer arrangement according to one or more embodiments.

In an embodiment, the first sweeping layer has a larger coverage area than the second sweeping layer. Take the two sweeping layers shown in FIG. 6 as an example, the sweeping layer 1 could be configured at the outset for good coverage, especially taking into account the terminal devices at the cell edge. After that, when more and more terminal devices are present in the vicinity of the wireless network node, such as the AP as shown in FIG. 6, the previously-determined second sweeping layer may be configured to provide the detection of the uplink transmission for the local terminal devices, i.e., the terminal devices at the cell center.

In another embodiment, the sweeping layer 2 as exampled above may be configured at the beginning, and as the time goes by and the communication traffic at the remote area increases, then the sweeping layer 1 may be configured for the detection of the remote uplink transmission.

Due to the above configuration order, in one or more embodiments with regards to the configuring of the second sweeping layer, the method 40 may determine at block S423, based on measurement reports from a plurality of terminal devices, an uplink coverage margin for detection of uplink transmission and a downlink coverage margin for reception of downlink transmission for each of the plurality of terminal devices. Then, the method 400 may calculate, at block S424, an uplink-downlink coverage gap based on differences of the uplink coverage margins and the downlink coverage margins with respect to the plurality of terminal devices. After that, the method 40 may determine, at block S425, whether the second sweeping layer is configured based on a comparison of the uplink-downlink coverage gap with a threshold. For example, after the comparison of the uplink-downlink coverage gap with the threshold, it may be determined that the uplink coverage area is too smaller as compared to the downlink coverage area, then the second sweeping layer, which has a greater coverage area than the first sweeping layer, may be configured to support uplink detection with the greater coverage area.

The operations of determining the uplink and downlink coverage margins and calculating the uplink-downlink coverage gap may be identical to those as discussed with reference to steps S21 and S22 in FIG. 2 and therefore further details thereof are omitted herein for a simplified purpose.

In one or more embodiments, once the second sweeping layer as above is configured, it is also possible to match the uplink coverage area and the downlink coverage area for the first sweeping layer. For example, an uplink-downlink coverage gap may be determined for the first sweeping layer and then whether the uplink coverage area and the downlink coverage area mutually match could be ascertained based on the comparison of the gap with the threshold. Thereafter, the adjustment for the first sweeping layer could be carried out for matching the uplink and downlink coverage areas if both layers do not match with each other.

In one or more embodiments, based on the changes of the traffic conditions, such as the result of the comparison with the preset threshold, one or more used sweeping layers could be removed or de-configured. For example, based on the observation that less traffic occurs at the center of the coverage of the wireless network node, the sweeping layer 2 as illustrated in FIG. 6 could be de-configured for e.g., overhead reduction. In this manner, the configuration of a number of the sweeping layers for uplink transmission according to the present disclosure could be adaptive.

In one or more embodiments, the uplink transmission is one of physical random access transmission and scheduling request transmission, and the downlink transmission is one of beacon signal transmission and measurement feedback transmission. Thereby, the solutions as proposed by the present disclosure may optimize the PRACH and scheduling request detection and the reception of the beacon signal and the measurement feedback.

For a better understanding of the adaptive multiple-layer solutions as discussed above, the following will use the PRACH detection as an example to elaborate more details.

Assume a single sweeping layer sweeping is configured for PRACH detection at the outset and then, if a too small PRACH coverage is detected and the calculated $Gap_{final}$, such as $Gap_{final-1}$ and $Gap_{final-2}$ as discussed before, exceeds a predefined threshold, meaning that the overhead cannot be overcome by increasing the receiver coverage simply via narrowing the receiver beam width and meanwhile keeping the receiver beam sweeping cycle unchanged. In this case, dual receiver sweeping layers may be determined and configured. That is to say, one additional receiver sweeping layer with "narrower receiver beam width+a larger number of receiver beams+a larger cycle" may be added for PRACH detection of the remote terminal devices.

Adding an additional sweeping layer may achieve a significant technical effect in terms of overhead reduction. For example, if the sweeping layer 1 are arranged with N (N>1) times more receiver beams and M (M>1) times cycle length than Layer 2, then the overhead of the receiver beam sweeping layers may be reduced to (N+3)/(M×N) as compared to using only the sweeping Layer 1 with the same cycle as the sweeping layer 2. If M is 4 and N is 4, then the resulting overhead reduction will be 7/16. It can be seen that near half of the overhead could be eliminated due to this two-sweeping-layer arrangement.

In some embodiment, if a small PRACH coverage is detected and the calculated $Gap_{final}$ does not exceed the predefined threshold, then a single sweeping layer may still be used. Afterwards, the PRACH coverage may be easily adjusted based on the methods as discussed with reference to FIGS. 1 and 2.

In some embodiments, the wireless network node may conditionally determine how many sweeping layers are to be configured for use and may dynamically or adaptively adjust the coverage areas of different layers. As one example, in case of the low traffic, the AP may determine a single PRACH receiver sweeping layer configured with narrow beams to reduce the overhead and meanwhile ensure the coverage. In case of the high traffic, the AP can determine and configure multiple layers (e.g., sweeping layers 1 and 2 as above) to optimize the delay and collisions of random access initiated by the terminal devices.

In some embodiments, the AP may adjust the coverage area and/or sweeping cycle of each layer separately according to the traffic distribution. For example, if most traffic is located in the center of AP coverage based on the statistics, the AP may increase the cycle of the sweeping layer 2 to provide large capacity for the PRACH detection.

The above discusses the adaptive multiple layer solutions from a perspective of a wireless network node. Hereinafter, the description would be made to adaptive multiple layer solutions as implemented at the terminal device side, i.e., from the terminal device's point of view, with reference to FIG. 5.

Figure 5:
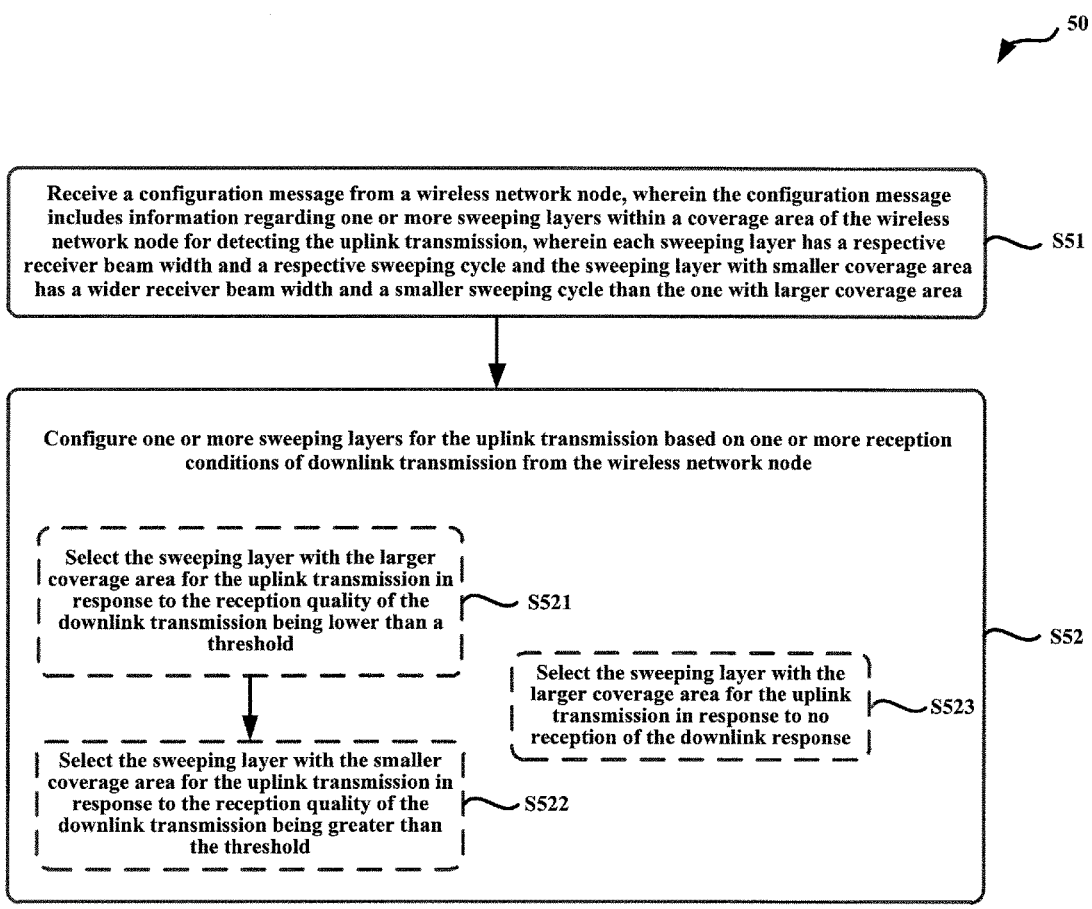
FIG. 5 is a logic flow diagram exemplarily illustrating a method for performing uplink transmission according to one or more embodiments.

FIG. 5 is a logic flow diagram exemplarily illustrating a method 50 for performing uplink transmission according to one or more embodiments.

As illustrated in FIG. 5, the method 50 receives, at block S51, a configuration message from a wireless network node, wherein the configuration message includes information regarding one or more sweeping layers within a coverage area of the wireless network node for detecting the uplink transmission, wherein each sweeping layer has a respective receiver beam width and a respective sweeping cycle and the sweeping layer with smaller coverage area has a wider receiver beam width and a smaller sweeping cycle than the one with larger coverage area. Then, at block S52, the method 50 configures one or more sweeping layers for the uplink transmission based on one or more reception conditions of downlink transmission from the wireless network node.

In one or more embodiments, the configuring of the one or more sweeping layers is based on reception quality of the downlink transmission and the method 50 may select, at block S521, the sweeping layer with the larger coverage area for the uplink transmission in response to the reception quality of the downlink transmission being lower than a threshold. In one or more embodiments, the method 50 may select, at block S522, the sweeping layer with the smaller coverage area for the uplink transmission in response to the reception quality of the downlink transmission being greater than the threshold.

In one or more embodiments, the configuring of the one or more sweeping layers is based on whether a downlink response is received and the method 50 may select, at block S523, the sweeping layer with the larger coverage area for the uplink transmission in response to no reception of the downlink response.

In one or more embodiments, the uplink transmission is one of PRACH transmission and scheduling request transmission, and the downlink transmission is one of beacon signal transmission and measurement feedback transmission.

From the above description made with respect to FIG. 5, it is to be understood that the terminal device according to one or more embodiments of the present disclosure may be able to dynamically and flexibly select a desired sweeping layer for uplink transmission. In this manner, the overhead could be decreased and the success rate of the random access may be improved. In addition, the delay for random access can be reduced when the terminal device selects a smaller sweeping layer due to the smaller sweeping layer having a smaller sweeping cycle.

It is to be understood that the above descriptions are merely for an illustrative purpose and that the person skilled in the art may, based on the teaching of the present disclosure, devise other equivalents and alternatives without deviating from the scope and spirit of the present disclosure. For example, after utilization of the sweeping layer with the smaller coverage area for uplink transmission, the terminal device may configure the second sweeping layer with the larger coverage area. Alternatively, the terminal device may still user the single sweeping layer for uplink transmission but with greater transmit power or beamforming gains. Once two sweeping layers are applied, the terminal device may di-configure one of them according to its current location or some instruction from the wireless network node.

Figure 7:
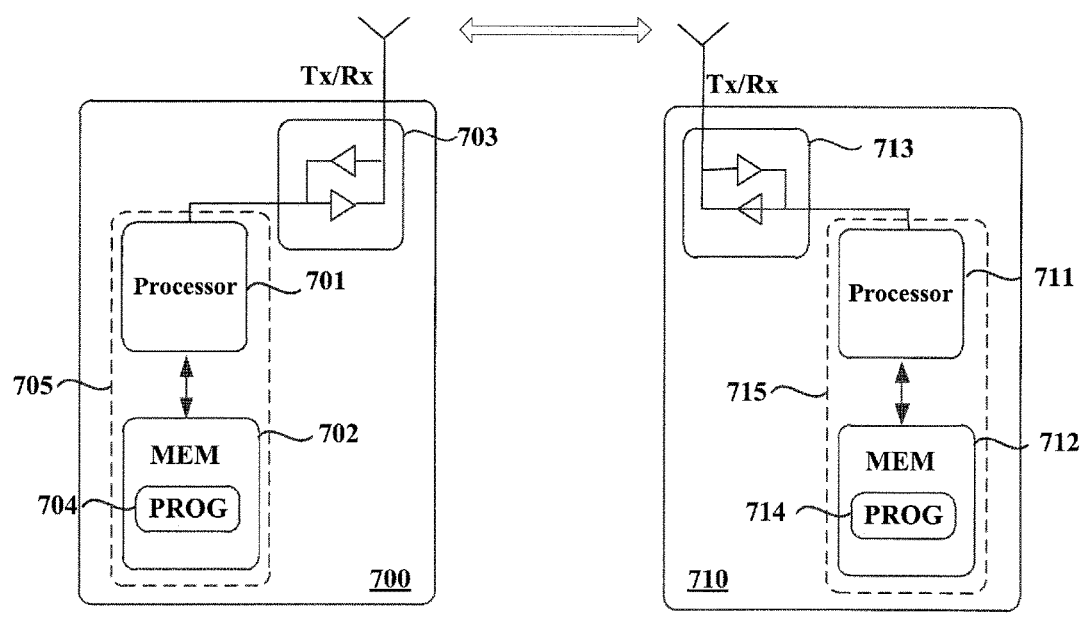
FIG. 7 is a schematic block diagram showing a wireless network node and a terminal device suitable for implementing some exemplary embodiments of the present disclosure detailed herein.

FIG. 7 is a schematic block diagram showing a wireless network node 700 and a terminal device 710 suitable for implementing some exemplary embodiments of the present disclosure detailed herein.

As illustrated in FIG. 7, the wireless network node 700 includes at least one processor 701, such as a data processor, at least one memory (MEM) 702 coupled to the processor 701, and a suitable RF transmitter TX and receiver RX 703 coupled to the processor 701. The MEM 702 stores a program (PROG) 704. The transmitter/receiver 703 is for bidirectional wireless communications with the terminal device 710 via an air interface.

The PROG 704 is assumed to include instructions that, when executed by the processor 701, enable the wireless network node 700 to operate in accordance with the example embodiments of the present disclosure, as discussed herein with the methods 20 and 40. For example, the wireless network node 700 may be embodied as a Base Station ("BS"), an eNB, an AP, an AN, or a part thereof, to carry out the corresponding steps directed thereto as discussed in the methods 20 and 40.

In general, the example embodiments of the present disclosure may be implemented by computer software executable by at least one processor 701 of the wireless network node 700, or by hardware, or by a combination of software and hardware.

In addition, the at least one processor 701 and the memory 702 may be combined as processing means 705 operative to perform the relevant steps as illustrated in the methods 20 and 40 with respect to the wireless network node 700.

As shown, the terminal device 710 includes at least one processor 711, such as a data processor, at least one memory (MEM) 712 coupled to the processor 711, and a suitable RF transmitter and receiver 713 coupled to the processor 711. The MEM 712 stores a program (PROG) 714. The transmitter/receiver 713 is for bidirectional wireless communications with the wireless network node 700.

The PROG 712 is assumed to include instructions that, when executed by the processor 711, enable the terminal device 710 to operate in accordance with the example embodiments of the present disclosure, as discussed herein with the methods 30 and 50. For example, the terminal device 710 may be embodied as a user equipment ("UE"), such as a mobile station, a mobile phone, a smart phone, a pad, a tablet computer, etc., or a part thereof, to carry out the corresponding steps directed thereto as discussed in the methods 30 and 50.

In general, the example embodiments of the present disclosure may be implemented by computer software executable by at least one processor 711 of the terminal device 710, or by hardware, or by a combination of software and hardware.

In addition, the at least one processor 711 and the memory 712 may be combined as processing means 715 operative to perform the relevant steps as illustrated in the methods 30 and 50 with respect to the terminal device 710.

The MEMs 702 and 712 may be of any type suitable to the local technical environment and may be implemented using any suitable data storage technology, such as semiconductor based memory devices, magnetic memory devices and systems, optical memory devices and systems, fixed memory and removable memory, as non-limiting examples. While only one MEM is shown in each of the wireless network node 700 and the terminal device 710, there may be several physically distinct memory units in each of them. The processors 701 and 711 may be of any type suitable to the local technical environment, and may include one or more of general purpose computers, special purpose computers, microprocessors, digital signal processors (DSPs) and processors based on multicore processor architecture, as non-limiting examples. The wireless network node 700 and the terminal device 710 may have multiple processors, such as for example an application specific integrated circuit chip that is slaved in time to a clock which synchronizes the main processor.

The techniques described herein may be implemented by various means so that an apparatus implementing one or more functions of a corresponding mobile entity described with an embodiment comprises not only prior art means, but also means for implementing the one or more functions of a corresponding apparatus described with an embodiment and it may comprise separate means for each separate function, or means may be configured to perform two or more functions.

Figure 8:
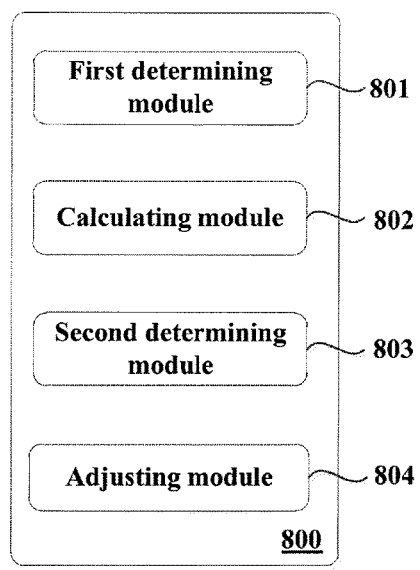
FIG. 8 is a schematic block diagram showing a wireless network node suitable for implementing some exemplary embodiments of the present disclosure detailed herein.

FIG. 8 is a schematic block diagram showing a wireless network node 800 suitable for implementing some exemplary embodiments of the present disclosure detailed herein.

As illustrated in FIG. 8, the wireless network node 800 according to the example embodiments of the present disclosure may include a first determining module 801 for determining, based on measurement reports from a plurality of terminal devices, an uplink coverage margin for detection of uplink transmission and a downlink coverage margin for reception of downlink transmission for each of the plurality of terminal devices. The wireless network node may also include a calculating module 802 for calculating an uplink-downlink coverage gap based on differences of the uplink coverage margins and the downlink coverage margins with respect to the plurality of terminal devices. The wireless network node may further include a second determining module 803 for determining whether the uplink coverage area and the downlink coverage area are matched with each other based on the uplink-downlink coverage gap. The wireless network node may additionally include an adjusting module 804 for adjusting at least one of the uplink coverage area and the downlink coverage area in response to determining that the uplink coverage area and the downlink coverage area are not matched with each other.

It is to be understood that the wireless network node 800 may perform operations in accordance with the example embodiments of the present disclosure, as discussed herein with the methods 20 and 40.

Figure 9:
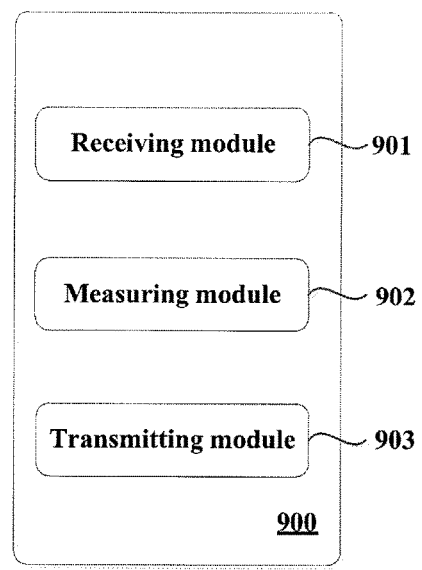
FIG. 9 is a schematic block diagram showing a terminal device suitable for implementing some exemplary embodiments of the present disclosure detailed herein.

FIG. 9 is a schematic block diagram showing a terminal device 900 suitable for implementing some exemplary embodiments of the present disclosure detailed herein.

As illustrated in FIG. 9, the terminal device 900 may include a receiving module 901 for receiving a measurement instruction message from the wireless network node. The terminal device 900 may also include a measuring module 902 for measuring transmit power of uplink transmission and received power of downlink transmission based on the measurement instruction message. The terminal device 900 may additionally include a transmitting module 903 for transmitting a measurement report regarding the transmit power and the received power to the wireless network node for matching the uplink coverage area and downlink coverage areas using the method 20 as discussed with regards to FIG. 2.

It is to be understood that the terminal device 900 may perform operations in accordance with the example embodiments of the present disclosure, as discussed herein with the method 30.

Figure 10:
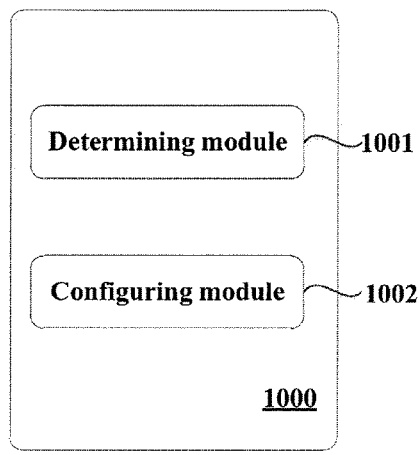
FIG. 10 is a schematic block diagram showing a wireless network node suitable for implementing some exemplary embodiments of the present disclosure detailed herein.

FIG. 10 is a schematic block diagram showing a wireless network node 1000 suitable for implementing some exemplary embodiments of the present disclosure detailed herein.

As illustrated in FIG. 10, the wireless network node 1000 may include a determining module 1001 for determining one or more sweeping layers for detecting the uplink transmission. The wireless network node 1000 may also include a configuring module 1002 for configuring, based on one or more traffic conditions within a coverage area of the wireless network node, the one or more sweeping layers for detecting the uplink transmission, wherein the sweeping layer with a smaller coverage area has a wider receiver beam and smaller sweeping cycle than the one with a larger coverage area when more than one sweeping layer is determined.

It is to be understood that the wireless network node 1000 may perform operations in accordance with the example embodiments of the present disclosure, as discussed herein with the method 40.

Figure 11:
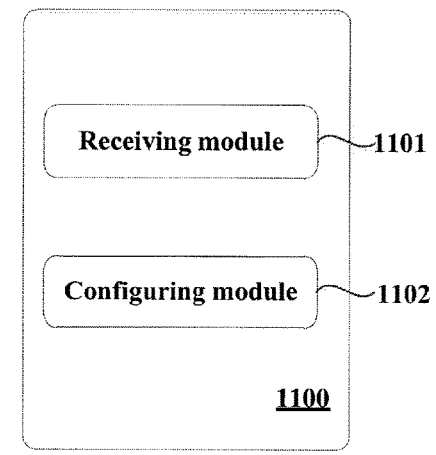
FIG. 11 is a schematic block diagram showing a terminal device suitable for implementing some exemplary embodiments of the present disclosure detailed herein.

FIG. 11 is a schematic block diagram showing a terminal device 1100 suitable for implementing some exemplary embodiments of the present disclosure detailed herein.

As illustrated in FIG. 11, the terminal device 1100 may include a receiving module 1101 for receiving a configuration message from a wireless network node, wherein the configuration message includes information regarding one or more sweeping layers within a coverage area of the wireless network node for detecting the uplink transmission, wherein each sweeping layer has a respective receiver beam width and a respective sweeping cycle and the sweeping layer with smaller coverage area has a wider receiver beam width and a smaller sweeping cycle than the one with larger coverage area. The terminal device 1100 may also include a configuring module 1102 for configuring one or more sweeping layers for the uplink transmission based on one or more reception conditions of downlink transmission from the wireless network node.

The foregoing has described various aspects and embodiments of the present disclosure. Many modifications and other embodiments of the disclosures set forth herein will come to mind to one skilled in the art to which these embodiments of the disclosure pertain having the benefit of the teachings presented in the foregoing descriptions and the associated drawings. Therefore, it is to be understood that the embodiments of the disclosure are not to be limited to the specific embodiments disclosed and that modifications and other embodiments are intended to be included within the scope of the appended claims. Although specific terms are employed herein, they are used in a generic and descriptive sense only and not for purposes of limitation.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A wireless network node for matching an uplink coverage area and a downlink coverage area, comprising:
   a processor; and
   a memory, the memory containing instructions executable by the processor, whereby the wireless network node is operative to:
   determine, based on measurement reports from a plurality of terminal devices, an uplink coverage margin for detection of uplink transmission and a downlink coverage margin for reception of downlink transmission for each of the plurality of terminal devices;
   calculate an uplink-downlink coverage gap based on differences of the uplink coverage margins and the downlink coverage margins with respect to the plurality of terminal devices;
   determine whether the uplink coverage area and the downlink coverage area are matched with each other based on the uplink-downlink coverage gap; and adjust at least one of the uplink coverage area and the downlink coverage area in response to determining that the uplink coverage area and the downlink coverage area are not matched with each other.

2. The wireless network node according to claim 1, wherein the uplink transmission is physical random access channel transmission and the wireless network node is operative to:
  calculate, as the uplink coverage margin, a difference between maximum transmit power of the terminal device and transmit power as reported by the terminal device with respect to the physical random access channel transmission;
  calculate, as the uplink coverage margin, a difference between a signal to interference and noise ratio of received physical random access channel transmission and a minimum required signal to interference and noise ratio for physical random access channel detection; or
  calculate, as the uplink coverage margin, a difference between a signal to noise ratio of the received physical random access channel transmission and a minimum required signal to noise ratio for the physical random access channel detection.

3. The wireless network node according to claim 1, wherein the downlink transmission is downlink beacon transmission and the wireless network node is operative to:
  calculate, as the downlink coverage margin, a difference between received power of the downlink beacon transmission reported by the terminal device and minimum required received power of the downlink beacon transmission.

4. The wireless network node according to claim 1, wherein the wireless network node is operative to:
  average, as the uplink-downlink coverage gap, differences of the uplink coverage margins and the downlink coverage margins with respect to the plurality of terminal devices; or
  select, as the uplink-downlink coverage gap, a difference that meets a predefined probability according to cumulative probability distribution with respect to the differences.

5. The wireless network node according to claim 1, wherein the wireless network node is operative to:
  compare the uplink-downlink coverage gap with a predefined threshold; and
  determine, based on a result of the comparing, whether the uplink coverage area is greater than the downlink coverage area or the uplink coverage area is smaller than the downlink coverage area.

6. The wireless network node according to claim 5, wherein the wireless network node is operative to at least one of the following in response to the uplink coverage area being smaller than the downlink coverage area:
  narrow a width of a receiver beam to increase a receiver beamforming gain at the wireless network node;
  widen a width of a transmitter beam to decrease a transmitter beamforming gain at the wireless network node; and
  decrease transmit power of the downlink transmission to reduce the downlink coverage area.

7. The wireless network node according to claim 5, wherein the wireless network node is operative to at least one of the following in response to the uplink coverage area being greater than the downlink coverage area:
  widen a width of a receiver beam to decrease a receiver beamforming gain at the wireless network node;
  narrow a width of a transmitter beam to increase a transmitter beamforming gain at the wireless network node; and
  increase transmit power of the downlink transmission to increase the downlink coverage area.

* * * * *